United States Patent
Zubarev et al.

(10) Patent No.: US 11,520,310 B2
(45) Date of Patent: Dec. 6, 2022

(54) GENERATING CONTROL SETTINGS FOR A CHEMICAL REACTOR

(71) Applicant: International Business Machines Corporation, Armonk, NY (US)

(72) Inventors: Dmitry Zubarev, San Jose, CA (US); Victoria A. Piunova, Los Gatos, CA (US); Nathaniel H. Park, San Jose, CA (US); James L. Hedrick, Pleasanton, CA (US); Sarath Swaminathan, Santa Clara, CA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 355 days.

(21) Appl. No.: 16/444,565

(22) Filed: Jun. 18, 2019

(65) Prior Publication Data
US 2020/0401111 A1 Dec. 24, 2020

(51) Int. Cl.
G05B 19/4155 (2006.01)
G06N 20/00 (2019.01)
G05B 13/02 (2006.01)

(52) U.S. Cl.
CPC ..... *G05B 19/4155* (2013.01); *G05B 13/0265* (2013.01); *G06N 20/00* (2019.01); *G05B 2219/32375* (2013.01)

(58) Field of Classification Search
CPC .................................................. G06N 20/00
USPC ....................................................... 700/266
See application file for complete search history.

(56) References Cited

U.S. PATENT DOCUMENTS

| | | | |
|---|---|---|---|
| 6,029,157 | A | 2/2000 | Mihatsch |
| 6,587,845 | B1 | 7/2003 | Braunheim |
| 7,611,756 | B2 | 11/2009 | Pfeifer et al. |
| 8,598,283 | B2 | 12/2013 | Markel et al. |

(Continued)

FOREIGN PATENT DOCUMENTS

| | | |
|---|---|---|
| CN | 101414158 A | 4/2009 |
| CN | 100511042 | 7/2009 |

(Continued)

OTHER PUBLICATIONS

List of IBM Patents or Applications Treated as Related.
(Continued)

*Primary Examiner* — Md Azad
(74) *Attorney, Agent, or Firm* — Amin, Turocy & Watson, LLP

(57) ABSTRACT

Techniques regarding autonomously controlling one or more chemical reactors using generative machine learning models are provided. For example, one or more embodiments described herein can comprise a system, which can comprise a memory that can store computer executable components. The system can also comprise a processor, operably coupled to the memory, and that can execute the computer executable components stored in the memory. The computer executable components can comprise a model component that can build a generative machine learning model based on training data regarding a past chemical reactor operation. The generative machine learning model can generate a recommended chemical reactor control setting for experimental discovery of a polymer.

19 Claims, 14 Drawing Sheets

(56) References Cited

U.S. PATENT DOCUMENTS

| | | | |
|---|---|---|---|
| 9,040,605 | B2 | 5/2015 | Deshpande et al. |
| 2016/0175829 | A1 | 6/2016 | Bergens et al. |
| 2017/0166690 | A1 | 6/2017 | Matthews et al. |
| 2017/0354946 | A1 | 12/2017 | Cronin |
| 2018/0165583 | A1 | 6/2018 | Guiver et al. |
| 2018/0304225 | A1 | 10/2018 | Bourke, Jr. |
| 2019/0295685 | A1* | 9/2019 | Elemento ............... G16C 20/50 |
| 2020/0082916 | A1* | 3/2020 | Polykovskiy ........ G06N 3/0454 |
| 2020/0098449 | A1* | 3/2020 | Simonetta ............. G16C 20/90 |
| 2020/0150601 | A1* | 5/2020 | Valpola ................ G05B 13/048 |
| 2020/0379442 | A1* | 12/2020 | Chan .................... G05B 13/027 |
| 2021/0233620 | A1* | 7/2021 | Cronin .................. G16C 20/10 |

FOREIGN PATENT DOCUMENTS

| | | |
|---|---|---|
| CN | 103226728 A | 7/2013 |
| CN | 106951919 | 7/2017 |
| CN | 107168255 A | 9/2017 |
| CN | 108416363 A | 8/2018 |
| CN | 109071708 | 12/2018 |
| CN | 109872780 A | 6/2019 |
| WO | 2007035485 | 3/2007 |
| WO | 2016116947 | 6/2016 |

OTHER PUBLICATIONS

Mutha et al. "On-line nonlinear model-based estimation and control of a polymer reactor." AIChE Journal, 43(11), pp. 3042-3058. (1997). 17 pages.

Kim et al. "Computational generative models of reaction conditions: Virtual screening of inorganic materials synthesis parameters with deep learning." NPJ Computational Materials vol. 3, Article No. 53 (2017). 9 pages.

Mell, Peter, et al. "The NIST Definition of Cloud Computing." National Institute of Standards and Technology. Sep. 2011. 7 pages.

Richards et al. Measurement and control of polymerization reactors. Computers & chemical engineering, 30(10-12), pp. 1447-1463. (2006). 17 pages.

Anonymous. Improved PP Impact Copolymers With High Molecular Weight Ethylene-Propylene Rubber. IPCOM000190556D. (2009). 3 pages.

Kim, et al. "Virtual screening of inorganic materials synthesis parameters with deep learning" NPJ Computational Materials vol. 3, Article No. 53 (2017). 9 pages.

International Search Report and Written Opinion for PCT Application Serial No. PCT/IB2020/054320 dated Aug. 17, 2020, 7 pages.

Non-Final Office Action received for U.S. Appl. No. 16/444,525 dated Aug. 19, 2022, 59 pages.

* cited by examiner

GENERATING CONTROL SETTINGS FOR A CHEMICAL REACTOR

BACKGROUND

The subject disclosure relates to the generation of one or more control settings for one or more chemical reactors, and more specifically, to the use of one or more generative machine learning models to generate one or more recommended chemical reactor control settings and/or autonomously control one or more chemical reactors.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatuses and/or computer program products that can facilitate the use of one or more generative machine learning models to generate one or more recommended chemical reactor control settings are described.

According to an embodiment, a system is provided. The system can comprise a memory that can store computer executable components. The system can also comprise a processor, operably coupled to the memory, and that can execute the computer executable components stored in the memory. The computer executable components can comprise a model component that can build a generative machine learning model based on training data regarding a past chemical reactor operation. The generative machine learning model can generate a recommended chemical reactor control setting for experimental discovery of a polymer.

According to an embodiment, a computer-implemented method is provided. The computer-implemented method can comprise generating, by a system operatively coupled to a processor, a generative machine learning model based on training data regarding a past chemical reactor operation. The generative machine learning model can generate a recommended chemical reactor control setting for experimental discovery of a polymer.

According to an embodiment, a computer program product for controlling a chemical reactor is provided. The computer program product can comprise a computer readable storage medium having program instructions embodied therewith. The program instructions can be executable by a processor to cause the processor to generate, by a system operatively coupled to the processor, a generative machine learning model based on training data regarding a past chemical reactor operation. The generative machine learning model can generate a recommended chemical reactor control setting for experimental discovery of a polymer.

DETAILED DESCRIPTION

Figure 1:
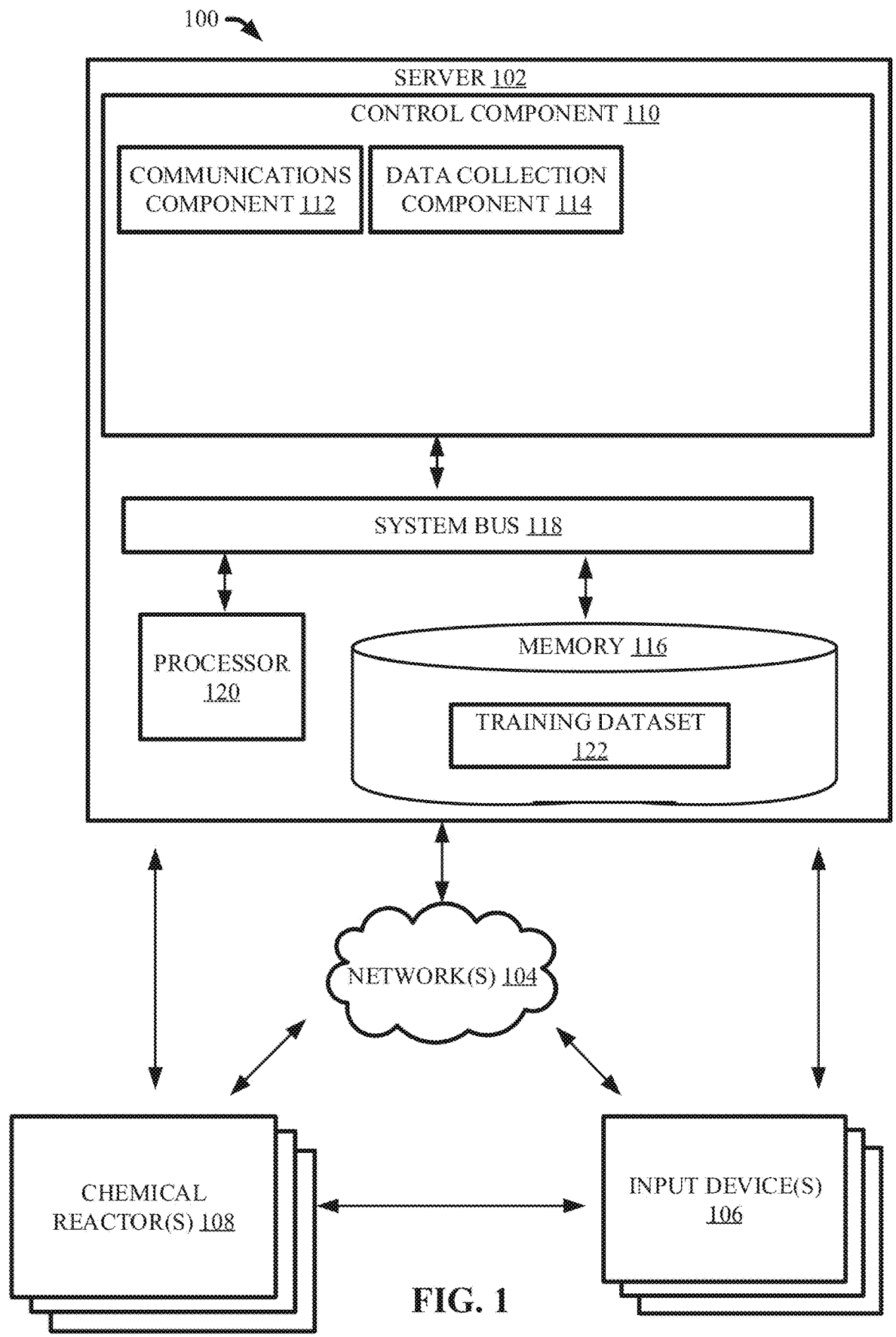
FIG. 1 illustrates a block diagram of an example, non-limiting system that can collect operation data regarding one or more past chemical reactor operations in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

For many life-science applications it is necessary to explore a particular class of polymer materials in order to determine optimal structure-activity or architecture-activity relationships. Manual synthesis of the members of such classes can be laborious and/or can rely solely on the discretion of the human experimentalist. Conventional experimentation techniques first predict a chemical structure of one or more polymers hypothesized to exhibit desired characteristics, then deduce a proposed synthesis scheme for generated the predicted chemical structure, and lastly determine one or more reactor control settings to facilitate implementation of the proposed synthesis scheme.

Various embodiments of the present invention can be directed to computer processing systems, computer-implemented methods, apparatus and/or computer program products that facilitate the efficient, effective, and autonomous (e.g., without direct human guidance) control of one or more chemical reactors through the use of one or more generative machine learning models. In various embodiments, the one or more generative machine learning models can generate one or more recommended chemical reactor control settings to discover and/or synthesize one or more polymers based on past chemical reactor operation. The generative machine learning models can include, for example, variational autoencoder ("VAE") models and/or gain adversarial network ("GAN") models. Further, one or more embodiments can regard the autonomous control of one or more chemical reactors in accordance with the recommended chemical reactor control settings.

The computer processing systems, computer-implemented methods, apparatus and/or computer program products employ hardware and/or software to solve problems that are highly technical in nature (e.g., experimental discovery of one or more polymers), that are not abstract and cannot be performed as a set of mental acts by a human. For example, an individual, or a plurality of individuals, cannot readily analyze the voluminous amount of chemical reactor data with the efficiency of the various embodiments described herein. For instance, one or more of the embodiments described herein can include one or more reiterative training processes that can analyze numerous past operations of multiple chemical reactors to generate new chemical reactor control settings for the autonomous discovery of one or more polymers.

FIG. 1 illustrates a block diagram of an example, non-limiting system 100 that can facilitate autonomous generation and/or implementation of one or more recommended control settings for the synthesis of one or more polymers. Repetitive description of like elements employed in other embodiments described herein is omitted for sake of brevity. Aspects of systems (e.g., system 100 and the like), apparatuses or processes in various embodiments of the present invention can constitute one or more machine-executable components embodied within one or more machines, e.g., embodied in one or more computer readable mediums (or media) associated with one or more machines. Such components, when executed by the one or more machines, e.g., computers, computing devices, virtual machines, etc. can cause the machines to perform the operations described.

FIG. 1 illustrates a block diagram of an example, non-limiting system 100 that can facilitate autonomous discovery and/or synthesis of one or more polymer materials based on one or more target polymer characteristics in accordance with one or more embodiments described herein. Repetitive description of like elements employed in other embodiments described herein is omitted for sake of brevity. Aspects of systems (e.g., system 100 and the like), apparatuses or processes in various embodiments of the present invention can constitute one or more machine-executable components embodied within one or more machines, e.g., embodied in one or more computer readable mediums (or media) associated with one or more machines. Such components, when executed by the one or more machines, e.g., computers, computing devices, virtual machines, etc. can cause the machines to perform the operations described.

As shown in FIG. 1, the system 100 can comprise one or more servers 102, one or more networks 104, one or more input devices 106, and/or one or more chemical reactors 108. The server 102 can comprise control component 110. The control component 110 can further comprise communications component 112 and/or data collection component 114. Also, the server 102 can comprise or otherwise be associated with at least one memory 116. The server 102 can further comprise a system bus 118 that can couple to various components such as, but not limited to, the control component 110 and/or associated components, memory 116 and/or a processor 120. While a server 102 is illustrated in FIG. 1, in other embodiments, multiple devices of various types can be associated with or comprise the features shown in FIG. 1. Further, the server 102 can communicate with one or more cloud computing environments.

The one or more networks 104 can comprise wired and wireless networks, including, but not limited to, a cellular network, a wide area network (WAN) (e.g., the Internet) or a local area network (LAN). For example, the server 102 can communicate with the one or more input devices 106 and/or chemical reactors 108 (and vice versa) using virtually any desired wired or wireless technology including for example, but not limited to: cellular, WAN, wireless fidelity (Wi-Fi), Wi-Max, WLAN, Bluetooth technology, a combination thereof, and/or the like. Further, although in the embodiment shown the control component 110 can be provided on the one or more servers 102, it should be appreciated that the architecture of system 100 is not so limited. For example, the control component 110, or one or more components of the control component 110, can be located at another computer device, such as another server device, a client device, etc.

The one or more input devices 106 can comprise one or more computerized devices, which can include, but are not limited to: personal computers, desktop computers, laptop computers, cellular telephones (e.g., smart phones), computerized tablets (e.g., comprising a processor), smart watches, keyboards, touch screens, mice, a combination thereof, and/or the like. A user of the system 100 can utilize the one or more input devices 106 to input data into the system 100, thereby sharing (e.g., via a direct connection and/or via the one or more networks 104) said data with the one or more servers 102 and/or chemical reactors 108. For example, the one or more input devices 106 can send data to the communications component 112 (e.g., via a direct connection and/or via the one or more networks 104). Additionally, the one or more input devices 106 can comprise one or more displays that can present one or more outputs generated by the system 100 to a user. For example, the one or more displays can include, but are not limited to: cathode tube display ("CRT"), light-emitting diode display ("LED"), electroluminescent display ("ELD"), plasma display panel ("PDP"), liquid crystal display ("LCD"), organic light-emitting diode display ("OLED"), a combination thereof, and/or the like.

The one or more chemical reactors 108 can comprise one or more synthesis platforms such as flow reactors and/or batch reactors. For example, the one or more chemical reactors 108 can facilitate flow chemistry in which one or more chemical reactions can be performed in a continuously flowing stream of chemical reactants (e.g., using one or more pumps to propel chemical fluids through one or more tubes). In another example, the one or more chemical reactors 108 can facilitate batch chemistry. Example chemical reactors 108 can include, but are not limited to: tubular reactors, fixed bed reactors, fluid bed reactors, continuous stirred tank reactors, a combination thereof, and/or the like.

The data collection component 114 can collect training data from the one or more input devices 106 and/or chemical reactors 108 (e.g., via a direct electrical connection and/or the one or more networks 104). The training data can regard one or more previous operations of the one or more chemical reactors 108. For example, the training data can include, but is not limited to, the following control settings implemented during one or more chemical reactions previously performed by the one or more chemical reactors 108: chemical reactants, monomers, catalysts, co-catalysts, values of reactor parameters, initiators, retention time, temperature, flow rate, pressure, the order of component addition/mixing, exposure to ultraviolet light and/or other radiation, a combination thereof, and/or the like. For instance, the one or more chemical reactors 108 can send one or more control settings to the data collection component 114 via the one or more networks 104 and/or communications component 112. Additionally, control settings (e.g., regarding past operations of the one or more chemical reactors 108) can be entered into the system 100 and/or sent to the data collection component 114 by a user of the system 100 using the one or more input devices 106 via the one or more networks 104 and/or communications component 112.

In one or more embodiments, the data collection component 114 can generate and/or populate one or more training datasets 122 with the training data collected from the one or more input devices 106 and/or chemical reactors 108. For example, the data collection component 114 can generate and/or populate the one or more training datasets 122 with control settings of the one or more chemical reactors 108. As shown in FIG. 1, the one or more training datasets 122 can be comprised within the one or more memories 116. In various embodiments, the one or more training datasets 122 can be comprised within one or more cloud computing environments.

Figure 2:
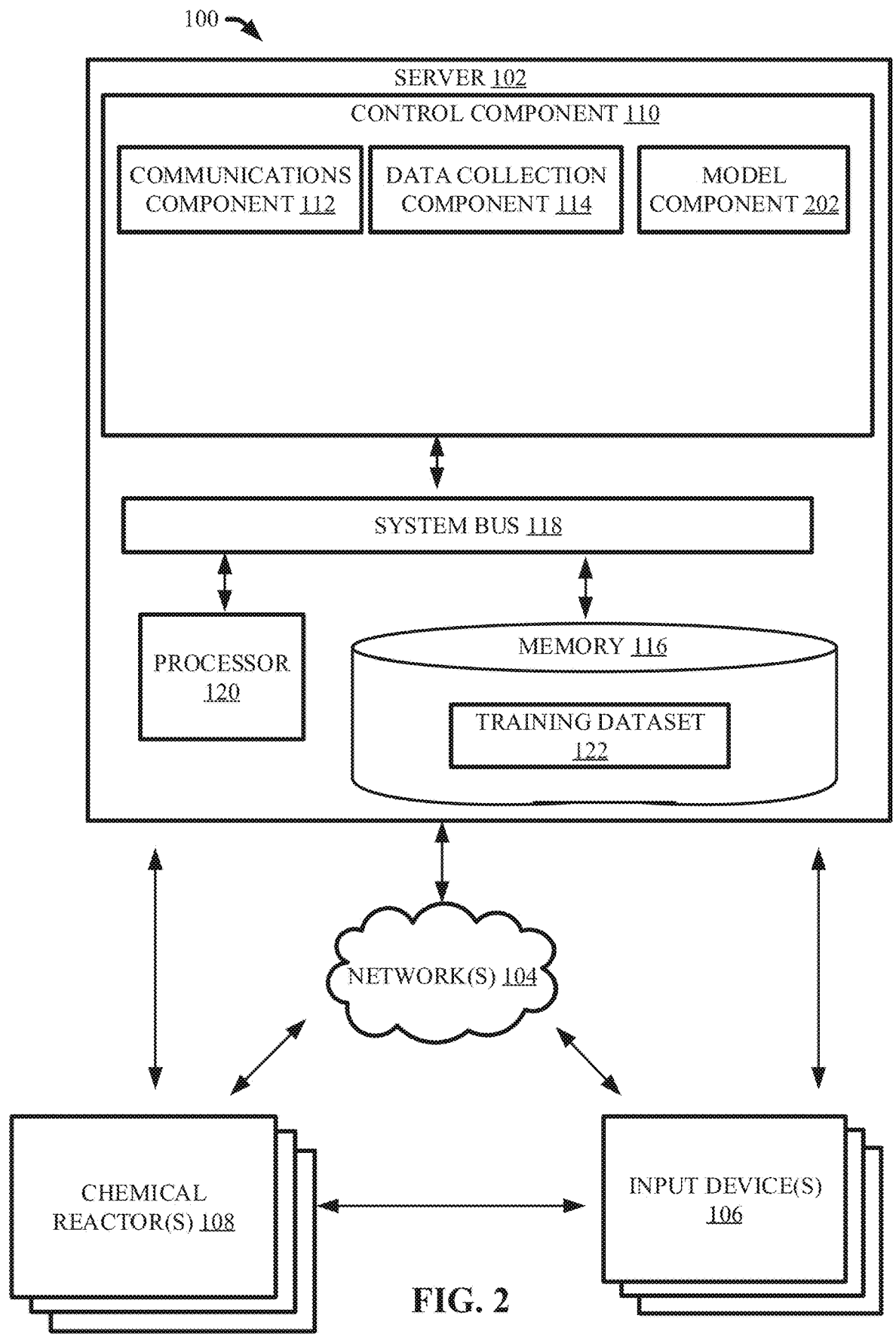
FIG. 2 illustrates a block diagram of an example, non-limiting system that can build one or more generative machine learning models to determine one or more recommended chemical reactor settings for the experimental discovery of one or more polymers in accordance with one or more embodiments described herein.

FIG. 2 illustrates a diagram of the example, non-limiting system 100 further comprising model component 202 in accordance with one or more embodiments described herein. Repetitive description of like elements employed in other embodiments described herein is omitted for sake of brevity. In various embodiments, the model component 202 can build one or more generative machine learning models based on the training data, wherein the one or more models can generate one or more recommended chemical reactor 108 control settings. For example, the model component 202 can generate one or more VAE models and/or GAN models based on the training data.

In various embodiments, the one or more recommended chemical reactor 108 control settings can comprise one or more control settings for the synthesis of one or more polymers by the one or more chemical reactors 108. Further, the one or more recommended chemical reactor 108 control settings can include one or more control settings and/or control setting combinations not included in the training data. In other words, the one or more recommended chemical reactor 108 control settings can include one or more control settings and/or control setting combinations that have yet to be implemented, to the knowledge of the system 100, on the one or more chemical reactors 108.

Figure 3:
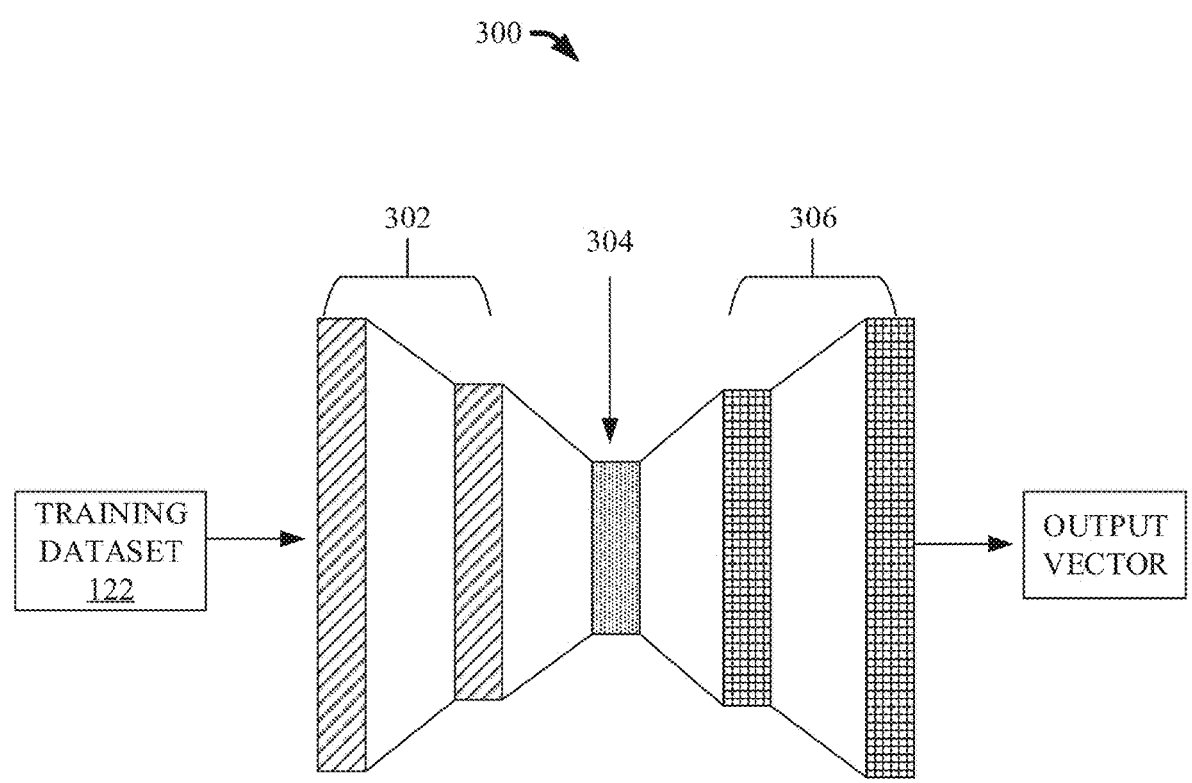
FIG. 3 illustrates a diagram of an example, non-limiting variational autoencoder model that can be generated by one or more systems to determine one or more recommended chemical reactor settings for the experimental discovery of one or more polymers in accordance with one or more embodiments described herein.

FIG. 3 illustrates a diagram of an example, non-limiting VAE training process 300 that can be performed by the one or more model components 202 when building one or more VAE models. Repetitive description of like elements employed in other embodiments described herein is omitted for sake of brevity. As shown in FIG. 3, the one or more VAE models can comprise one or more encoders 302, latent space 304, and/or decoders 306. The one or more encoders 302 can comprise one or more first neural networks that can encode the training data comprised in the one or more training datasets 122 into one or more latent variables comprised within the latent space 304. Further, the one or more encoders 302 can normalize the one or more latent variables. In various embodiments, the latent space 304 can be stochastic, and/or the one or more encoders 302 can encode to a Gaussian probability density. The one or more decoders 306 can comprise one or more second neural networks that can decode the one or more latent variables from the latent space 304 to output one or more vectors.

Additionally, the model component 202 can utilize one or more loss functions to analyze the amount of information loss experienced by the training data due to undergoing smaller to larger dimensionality. In various embodiments, the model component 202 can train the VAE model using a gradient descent algorithm to optimize the loss function with respect to one or more parameters (e.g., weight, bias, and/or step size) of the one or more encoders 302 and/or decoders 306. During one or more VAE training processes 300, the model component 202 can reiteratively train the one or more VAE models until the output vectors match the training data.

Figure 4:
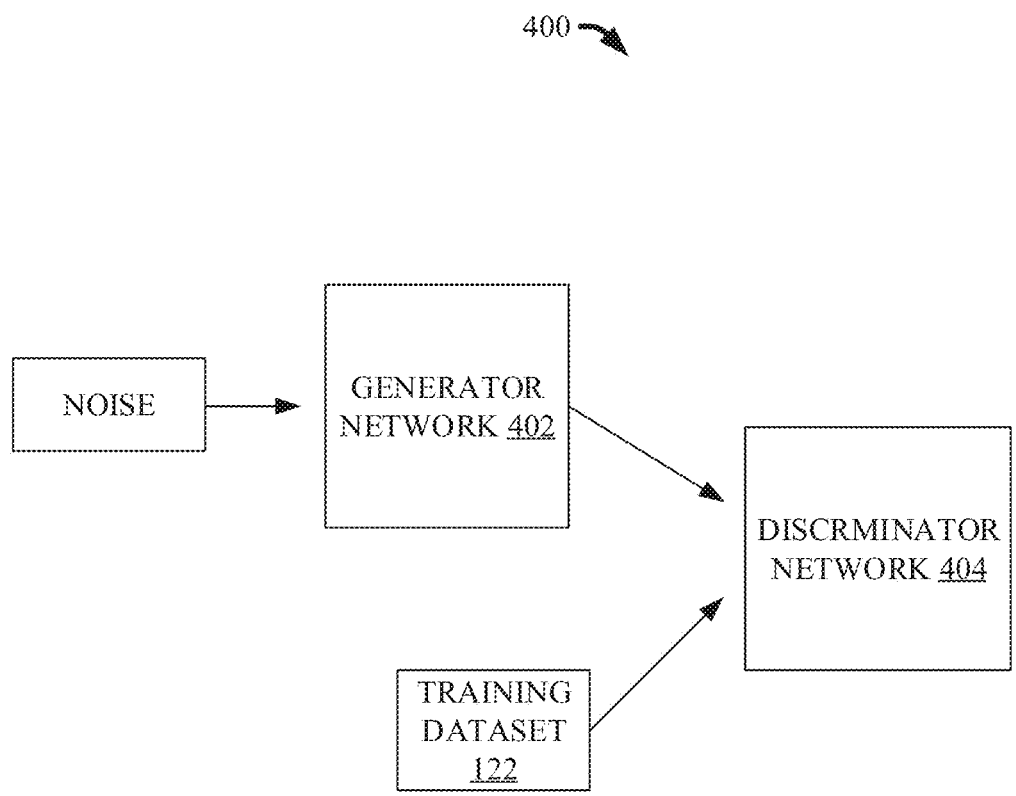
FIG. 4 illustrates a diagram of an example, non-limiting gain adversarial network model that can be generated by one or more systems to determine one or more recommended chemical reactor settings for the experimental discovery of one or more polymers in accordance with one or more embodiments described herein.

FIG. 4 illustrates a diagram of an example, non-limiting GAN training process 400 that can be performed by the one or more model components 202 when building one or more GAN models. Repetitive description of like elements employed in other embodiments described herein is omitted for sake of brevity. As shown in FIG. 4, the one or more GAN models can comprise one or more generator networks 402 and/or discriminator networks 404.

The one or more generator networks 402 can upsample one or more vectors of noise to generate new data, such as new control settings. The one or more discriminator networks 404 can receive the new data generated by the one or more generator networks 402 and the training data from the one or more training datasets 122 as inputs. Further, the one or more discriminator networks 404 can receive the one or more inputs without knowledge of the source of the inputs. Thereby, the one or more discriminator networks 404 can analyze the inputs without prior knowledge regarding whether the subject input is new data or training data. Further, the one or more discriminator networks 404 can analyze the one or more inputs to determine whether the one or more inputs are new data (e.g., new chemical reactor 108 control settings) generated by the one or more generator networks 402 or training data (e.g., past control settings implemented by one or more chemical reactors 108) from the one or more training datasets 122. For example, the one or more discriminator networks 404 can be binomial classifiers.

The GAN training process 400 can comprise iterative exchanges between the one or more generator networks 402 and discriminator networks 404. With each exchange, the one or more generator networks 402 can generate new data, and the one or more discriminator networks 404 can attempt to discern whether the new data was generated by the one or more generator networks 402 or sampled from the one or more training datasets 122. Further, the one or more generator networks 402 and/or discriminator networks 404 can learn from previous exchanges to further enhance and/or refine their respective functions (e.g., enhance the generator network's 402 ability to generate new data that can plausibly be considered training data, and/or enhance the discriminator network's 404 ability to discern between new data and training data). The one or more generator networks 402 can achieve a trained state when the one or more discriminator networks 404 are unable to discern between the new data generated by the generator networks 402 and the training data.

In various embodiments, the model component 202 can generate the one or more generative machine learning models (e.g., VAE models and/or GAN models), train the one or more generative machine learning models (e.g., via one or more VAE training processes 300 and/or GAN training processes 400), and/or generate one or more recommended chemical reactor 108 settings from the trained generative machine learning models. For example, one or more trained VAE models can sample and/or decode one or more latent variables from the latent space 304 to generate the one or more recommended chemical reactor 108 control settings. In another example, one or more trained GAN models can generate one or more recommended chemical reactor 108 control settings from one or more trained generator networks 402.

Figure 5:
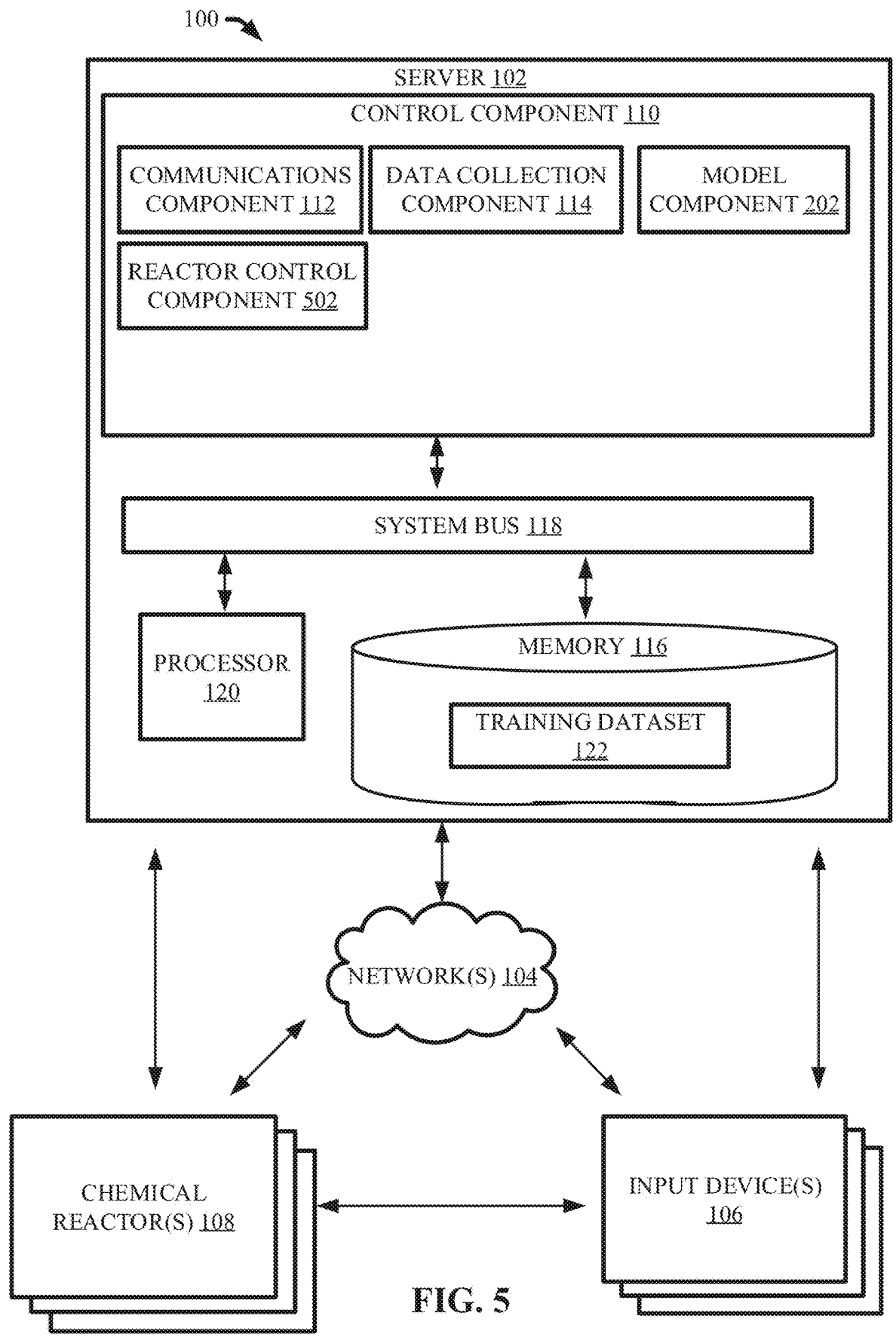
FIG. 5 illustrates a block diagram of an example, non-limiting system that can operate one or more chemical reactors based on one or more recommended chemical reactor settings in accordance with one or more embodiments described herein.

FIG. 5 illustrates a diagram of the example, non-limiting system 100 further comprising reactor control component 502 in accordance with one or more embodiments described herein. Repetitive description of like elements employed in other embodiments described herein is omitted for sake of brevity. In various embodiments, the reactor control component 502 can operate the one or more chemical reactors 108 in accordance with the one or more recommended chemical reactor 108 control settings generated by the model component 202. While FIG. 5 depicts the reactor control component 502 comprised within the one or more servers 102, the architecture of the system 100 is not so limited. For example, the reactor control component 502 can be comprised within the one or more chemical reactors 108, the one or more input devices 106, and/or a cloud computing environment (e.g., accessible via the one or more networks 104).

In one or more embodiments, the reactor control component 502 can set and/or alter one or more control settings of the one or more chemical reactors 108 based on the one or more recommended chemical reactor 108 control settings. Additionally, the reactor control component 502 can initiate, suspend, resume, and/or cease operation of the one or more chemical reactors 108. Wherein the system 100 comprises a plurality of chemical reactors 108, the reactor control component 502 can further determine which chemical reactor 108 to implement the recommended chemical reactor 108 control settings based on one or more reactor characteristics of the one or more chemical reactors 108. Example reactor characteristics can include, but are not limited to: operational status of the one or more chemical reactors 108, chemical compounds (e.g., reagents, catalysts, and/or initiators) readily accessible by the one or more chemical reactors 108, the types of chemical reactors 108 comprised within the system 100, one or more user preferences (e.g., entered into the system 100 via the one or more input devices 106), a combination thereof, and/or the like.

In one or more embodiments, the reactor control component 502 can autonomously implement the one or more recommended chemical reactor 108 control settings. Thereby, the production time of discovering and/or synthesizing one or more polymers can be reduced and/or minimized by the autonomous nature of the system 100.

Figure 6:
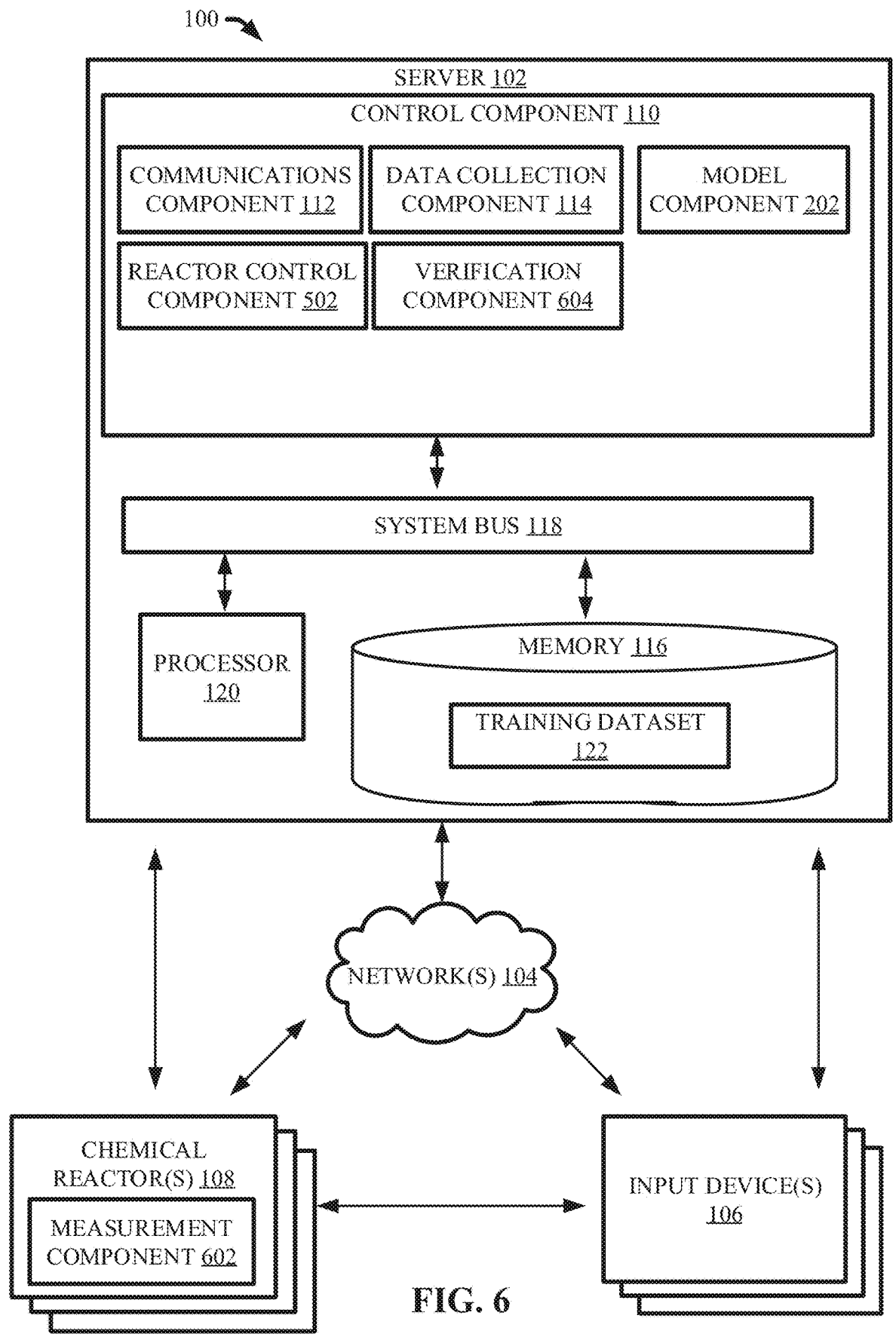
FIG. 6 illustrates a block diagram of an example, non-limiting system that can measure and/or detect one or more characteristics of one or more polymers synthesized by one or more chemical reactors as directed by one or more recommended chemical reactor control settings generated by a generative machine learning model in accordance with one or more embodiments described herein.

FIG. 6 illustrates a diagram of the example, non-limiting system 100 further comprising one or more measurement components 602 and/or verification components 604 in accordance with one or more embodiments described herein. Repetitive description of like elements employed in other embodiments described herein is omitted for sake of brevity. In various embodiments, the one or more measurement components 602 can measure and/or detect one or more characteristics of polymers synthesized by the one or more chemical reactors 108.

For example, the one or more chemical reactors 108 can comprise one or more measurement components 602 that can measure and/or detect one or more characteristics of polymer materials generated by the one or more chemical reactors 108 operated (e.g., via the reactor control component 502) in accordance with the one or more recommended chemical reactor 108 control settings. In various embodiments, each of the chemical reactors 108 can comprise one or more measurement components 602. Example characteristics that can be measured and/or detected by the one or more measurement components 602 can include, but are not limited to: molecular weight of synthesized polymers, chemical properties, chemical activity, molecular weight, PDI, ultraviolet-visible spectroscopy, retention time, temperature, a combination thereof, and/or the like. Example sensors that can be comprised within and/or controlled by the one or more measurement components 602 can include, but are not limited to: timers, thermometers, calorimeters, spectroscopic equipment, equipment for mechanical testing, biochemical assays, a combination thereof, and/or the like.

In various embodiments, one or more users of the system 100 can define one or more target polymer characteristics via the one or more input devices 106 and/or networks 104. Further, the one or more target polymer characteristics can define one or more characteristics that the one or more users desire to be exhibited by the synthesized polymers. In one or more embodiments, the one or more target polymer characteristics can define a value range regarding one or more parameters related to the physical and/or chemical properties of the one or more synthesized polymers.

In one or more embodiments, the verification component 604 can analyze one or more of the characteristics measured and/or detected by the one or more measurement components 602 to determine whether the one or more synthesized polymer materials exhibit the target polymer characteristics. Additionally, the verification component 604 can share the recommended chemical reactor 108 control settings, the characteristics obtained from the one or more measurement components 602, and/or the determinations generated by the verification component 604 with one or more users of the system 100 via the one or more input devices 106 and/or networks 104.

Figure 7:
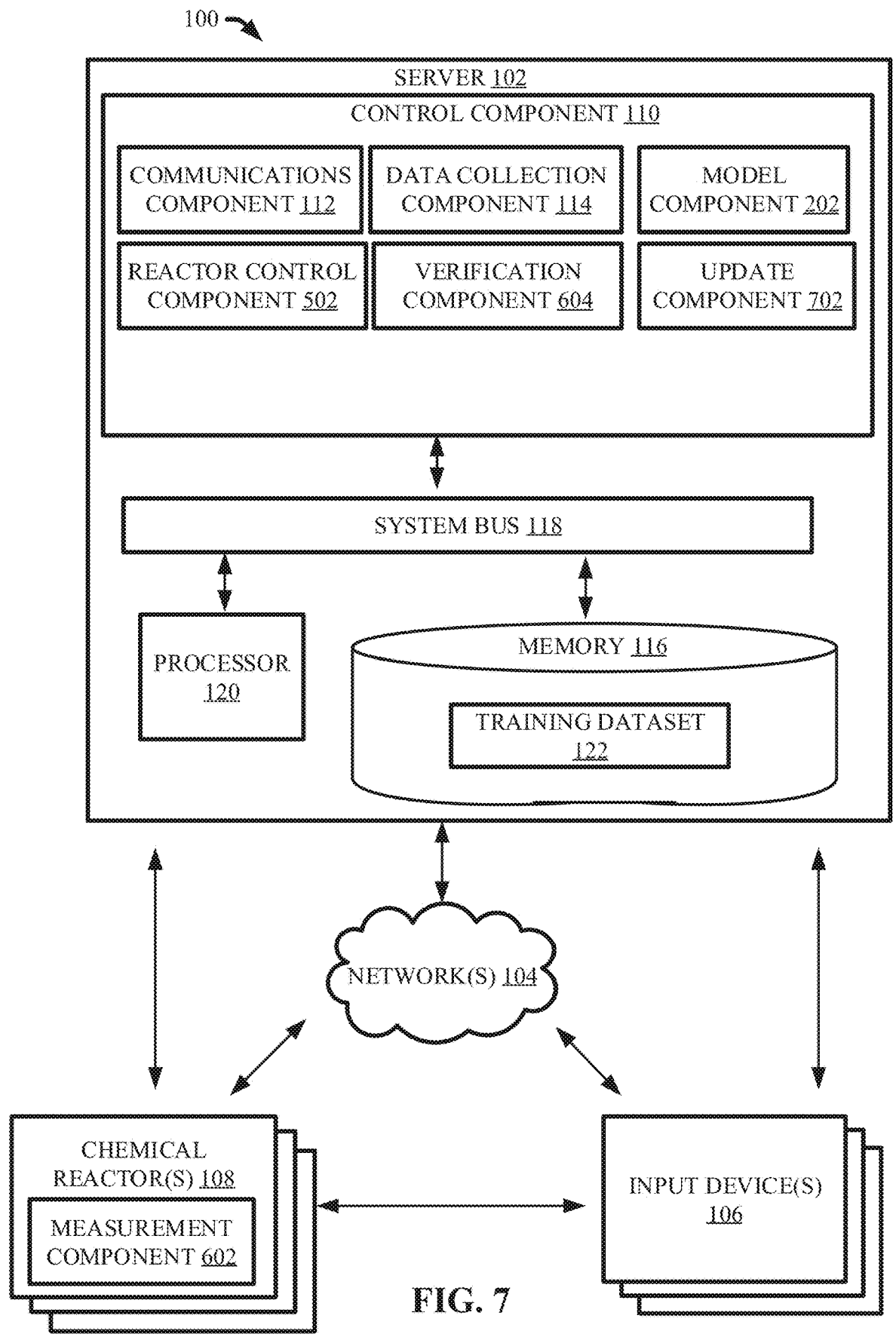
FIG. 7 illustrates a block diagram of an example, non-limiting system that can update one or more training datasets based on one or more polymers synthesized by recommended chemical reactor control settings in accordance with one or more embodiments described herein.

FIG. 7 illustrates a diagram of the example, non-limiting system 100 further comprising one or more update components 702 in accordance with one or more embodiments described herein. Repetitive description of like elements employed in other embodiments described herein is omitted for sake of brevity. In various embodiments, the update component 702 can further populate and/or update the training data comprised within the one or more training datasets 122 based on the recommended chemical reactor 108 control settings and/or the determinations made by the verification component 604. For example, in one or more embodiments the update component 702 can update the one or more training datasets 122 with the recommended chemical reactor 108 control settings based on the one or more polymers synthesized by the one or more recommended chemical reactor 108 control settings exhibiting the target polymer characteristics (e.g., as measured by the measurement component 602 and/or determined by the verification component 604).

Thereby, more and more training data can be made available to the model component 202 as the one or more chemical reactors 108 synthesis more and more polymers (e.g., in accordance with recommended chemical reactor 108 control settings). In various embodiments, the system 100 can autonomously: grow the amount of training data comprised within the one or more training datasets 122, increase the accuracy of recommended chemical reactor 108 control settings, and/or operate the one or more chemical reactors 108 to synthesize new polymers.

Figure 8:
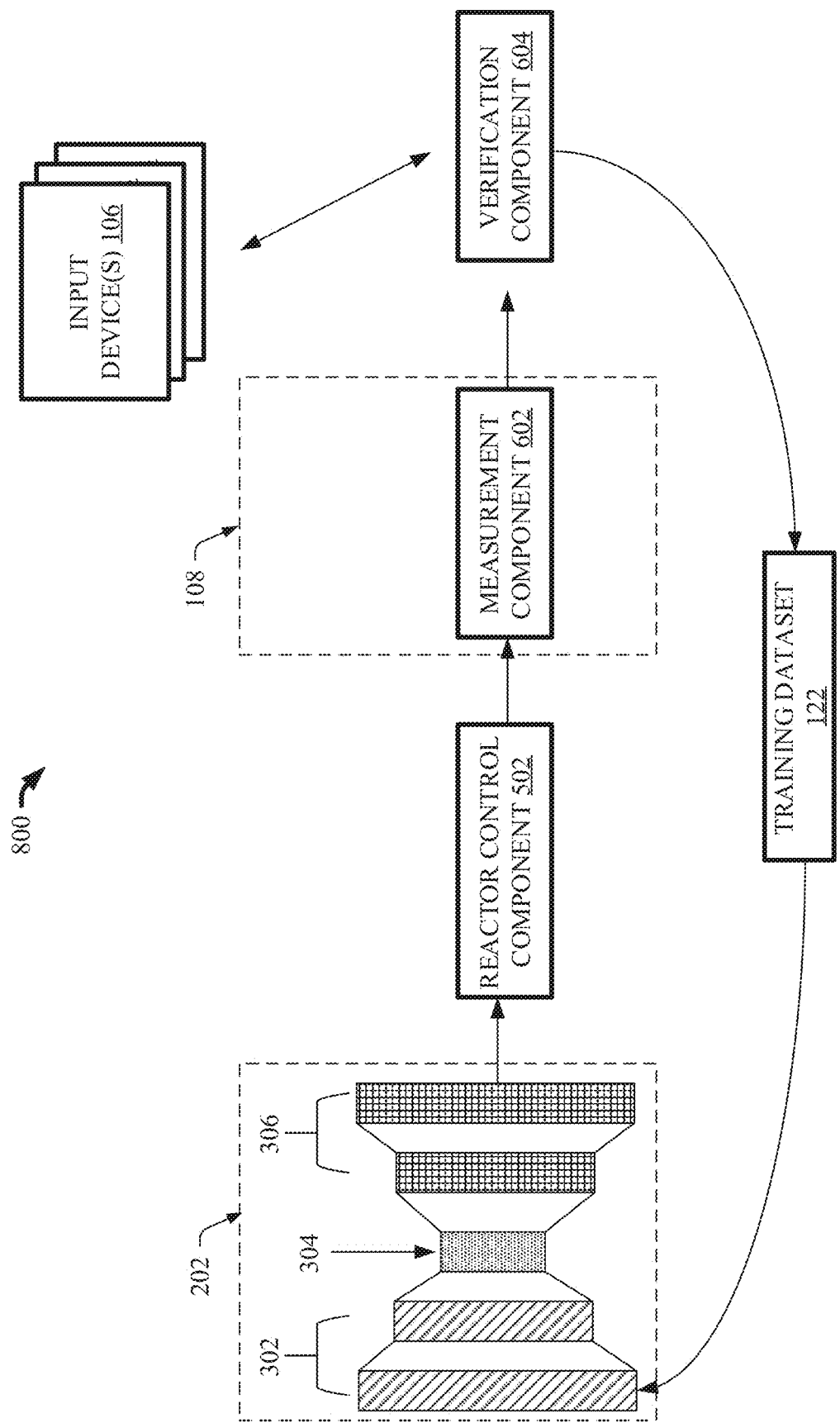
FIG. 8 illustrates a block diagram of an example, non-limiting system that can facilitate operation of one or more chemical reactors for the experimental discovery of one or more polymers using one or more variational autoencoder machine learning models in accordance with one or more embodiments described herein.

FIG. 8 illustrates a diagram of an example, non-limiting operation procedure 800 that can be performed by the system 100 in accordance with one or more embodiments described herein. Repetitive description of like elements employed in other embodiments described herein is omitted for sake of brevity. For example, operation procedure 800 can comprise the use of one or more trained VAE machine learning models to facilitate the autonomous control of one or more chemical reactors 108. In various embodiments, the one or more trained VAE models depicted in FIG. 8 can be trained via one or more VAE training processes 300 using training data comprised within the one or more training datasets 122 (e.g., as depicted in FIG. 3).

As shown in FIG. 8, the model component 202 can sample and/or decode one or more latent variables comprised within the one or more latent spaces 304 of the trained VAE models to generate one or more recommended chemical reactor 108 control settings. Further, the reactor control component 502 can operate the one or more chemical reactors 108 in accordance with the one or more recommended chemical reactor 108 control settings (e.g., as described herein). Additionally, one or more measurement components 602 (e.g., comprised within the one or more chemical reactors 108) can measure and/or detect one or more characteristics of one or more polymers synthesized by the one or more chemical reactors 108 operated in accordance with the one or more chemical reactor 108 control settings. For example, the measurement component 602 can measure and/or detect one or more parameters of the one or more synthesized polymers regarding physical activity, chemical activity, and/or chemical reactor 108 operation. Also, the verification component 604 can share the measured and/or detected polymer characteristics and/or the associate recommended chemical reactor 108 control settings with one or more users of the system 100 via the one or more input devices.

In various embodiments, the verification component 604 can further analyze the characteristics measured and/or detected by the measurement component 602 to determine whether the characteristics are target polymer characteristics. For example, the target polymer characteristics can be set by one or more users of the system 100 via the one or more input devices 106 and/or can define one or more desirable traits (e.g., with regards to the chemical and/or physical activity of synthesized polymers). In one or more embodiments, the verification component 604 can further update the one or more training datasets 122 with the one or more recommended chemical reactor 108 control settings in response to determining that the synthesized polymers exhibit one or more of the target polymer characteristics. Thereby, recommended chemical reactor 108 control settings found to achieve polymers with target characteristics can serve to further train the one or more generative machine learning models (e.g., VAE models) used to generate subsequent recommended chemical reactor 108 control settings.

Figure 9:
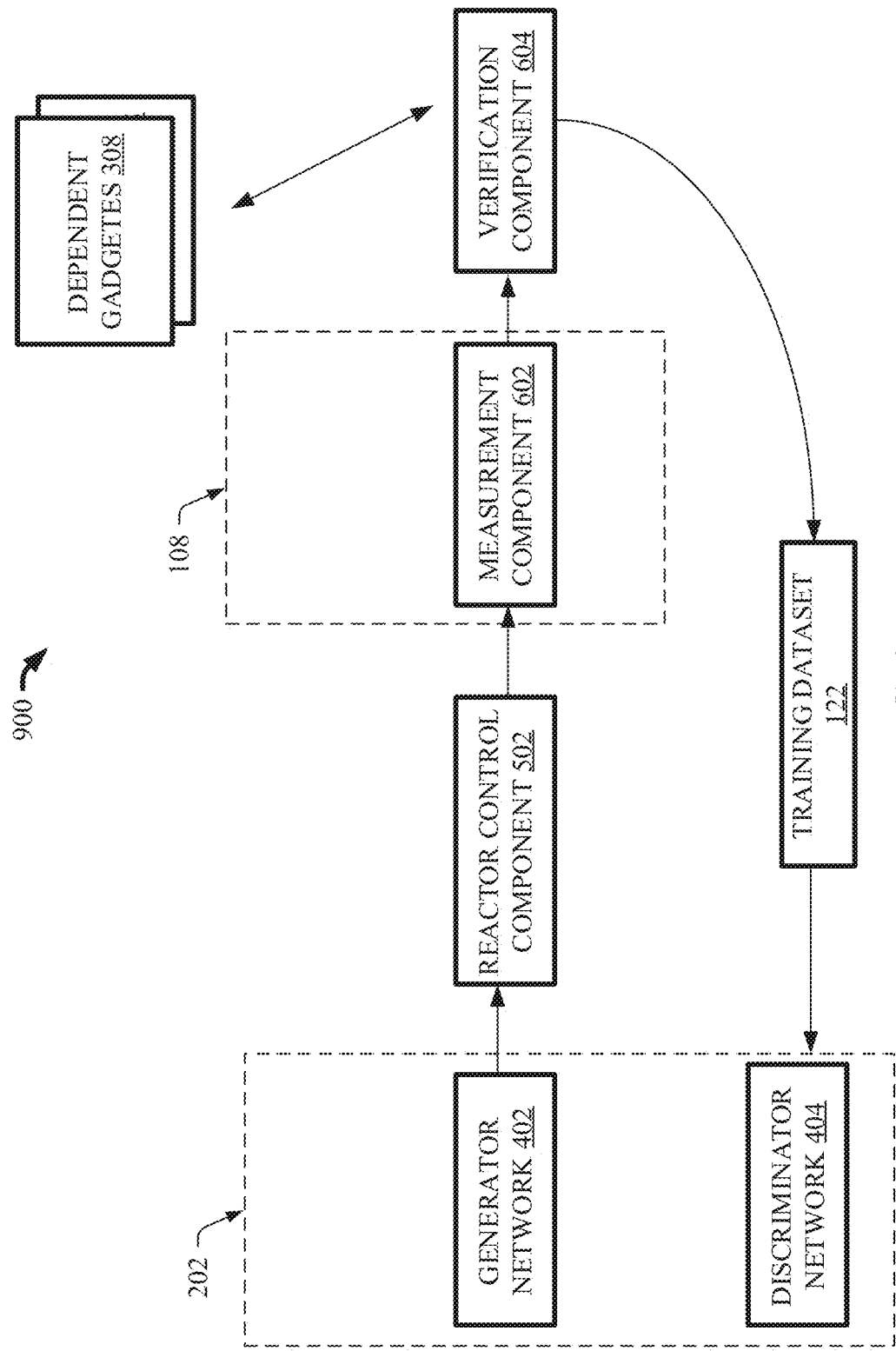
FIG. 9 illustrates a block diagram of an example, non-limiting system that can facilitate operation of one or more chemical reactors for the experimental discovery of one or more polymers using one or more gain adversarial network machine learning models in accordance with one or more embodiments described herein.

FIG. 9 illustrates a diagram of an example, non-limiting operation procedure 900 that can be performed by the system 100 in accordance with one or more embodiments described herein. Repetitive description of like elements employed in other embodiments described herein is omitted for sake of brevity. For example, operation procedure 900 can comprise the use of one or more trained GAN machine learning models to facilitate the autonomous control of one or more chemical reactors 108. In various embodiments, the one or more trained GAN models depicted in FIG. 9 can be trained via one or more GAN training processes 400 using training data comprised within the one or more training datasets 122 (e.g., as depicted in FIG. 4).

As shown in FIG. 9, the model component 202 can generate one or more recommended chemical reactor 108 control settings via one or more trained generator networks 402. Further, the reactor control component 502 can operate the one or more chemical reactors 108 in accordance with the one or more recommended chemical reactor 108 control settings (e.g., as described herein). Additionally, one or more measurement components 602 (e.g., comprised within the one or more chemical reactors 108) can measure and/or detect one or more characteristics of one or more polymers synthesized by the one or more chemical reactors 108 operated in accordance with the one or more chemical reactor 108 control settings. For example, the measurement component 602 can measure and/or detect one or more parameters of the one or more synthesized polymers regarding physical activity, chemical activity, and/or chemical reactor 108 operation. Also, the verification component 604 can share the measured and/or detected polymer characteristics and/or the associate recommended chemical reactor 108 control settings with one or more users of the system 100 via the one or more input devices.

In various embodiments, the verification component 604 can further analyze the characteristics measured and/or detected by the measurement component 602 to determine whether the characteristics are target polymer characteristics. For example, the target polymer characteristics can be set by one or more users of the system 100 via the one or more input devices 106 and/or can define one or more desirable traits (e.g., with regards to the chemical and/or physical activity of synthesized polymers). In one or more embodiments, the verification component 604 can further update the one or more training datasets 122 with the one or more recommended chemical reactor 108 control settings in response to determining that the synthesized polymers exhibit one or more of the target polymer characteristics. Thereby, recommended chemical reactor 108 control settings found to achieve polymers with target characteristics can serve to further train the one or more generative machine learning models (e.g., GAN models) used to generate subsequent recommended chemical reactor 108 control settings. For example, the updated training data (e.g., comprising the recommended chemical reactor 108 control settings) can be analyzed by the one or more discriminator networks 404 to further train the one or more discriminator networks 404, and thereby the one or more generator networks 402.

Figure 10:
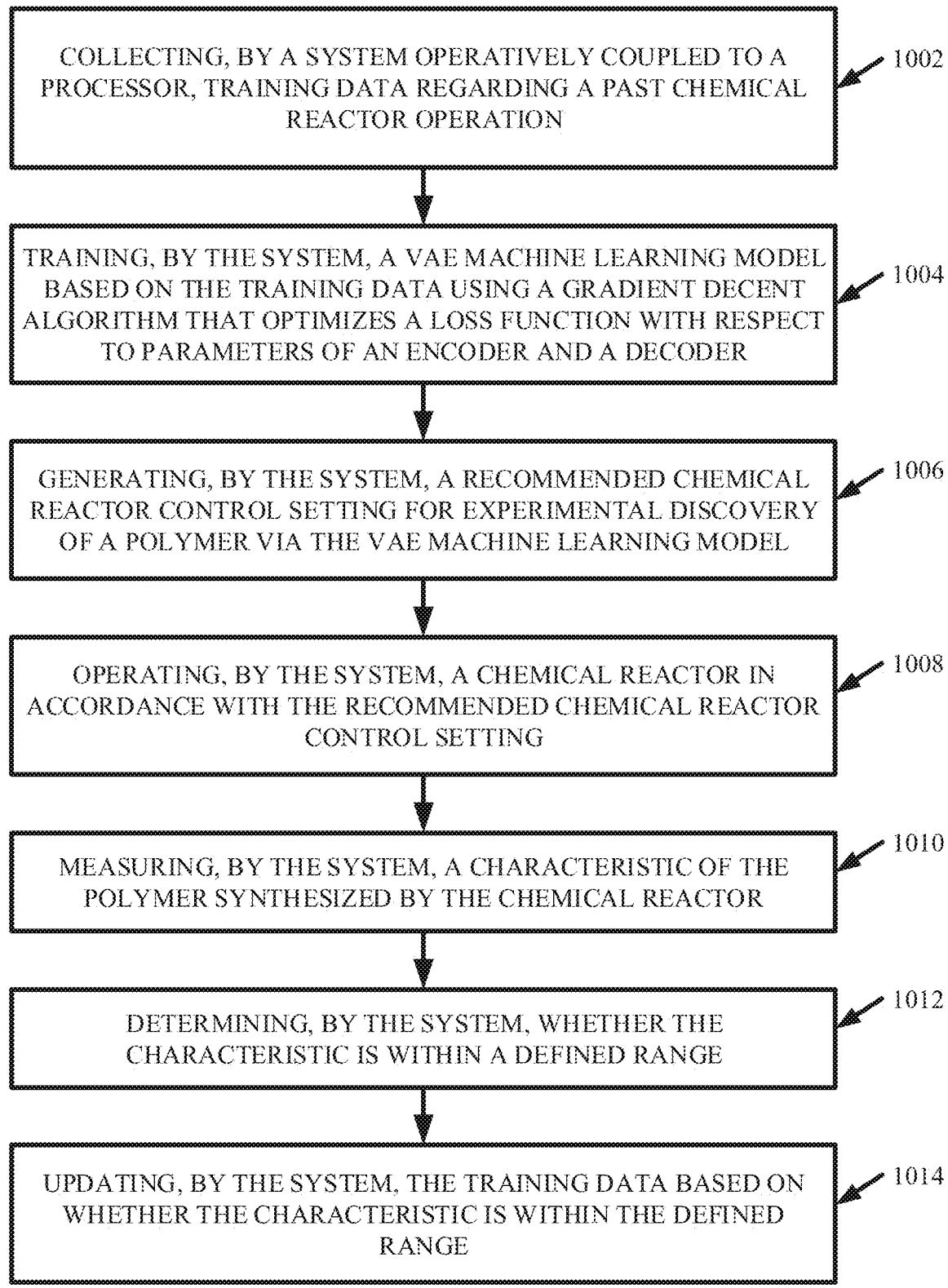
FIG. 10 illustrates a flow diagram of an example, non-limiting method that can facilitate operation of one or more chemical reactors for the experimental discovery of one or more polymers using one or more generative machine learning models in accordance with one or more embodiments described herein.

FIG. 10 illustrates a flow diagram of an example, non-limiting method 1000 that can facilitate controlling one or more chemical reactors 108 using one or more generative machine learning models in accordance with one or more embodiments described herein. Repetitive description of like elements employed in other embodiments described herein is omitted for sake of brevity.

At 1002, the method 1000 can comprise collecting (e.g., via data collection component 114), by a system 100 operatively coupled to a processor 120, training data regarding one or more past chemical reactor 108 operations. For example, the training data can include, but is not limited to the following control settings implemented during one or more chemical reactions previously performed by the one or more chemical reactors 108: chemical reactants, monomers, catalysts, co-catalysts, values of reactor parameters, initiators, retention time, temperature, flow rate, pressure, the order of component addition/mixing, exposure to ultraviolet light and/or other radiation, a combination thereof, and/or the like. In various embodiments, the collecting at 1002 can comprise generating and/or populating one or more training datasets 122 with the training data (e.g., as described herein).

At 1004, the method 1000 can comprise training (e.g., via model component 202), by the system 100, one or more VAE machine learning models based on the training data using one or more gradient decent algorithms that can optimize a loss function with respect to one or more parameters of one or more encoders 302 and/or decoders 306. For example, the training at 1004 can be performed in accordance with the various features described herein with regards to the one or more VAE training processes 300.

At 1006, the method 1000 can comprise generating (e.g., via model component 202), by the system 100, one or more recommended chemical reactor 108 control settings for experimental discovery of one or more polymers via the one or more VAE machine learning models. For example, the one or more recommended chemical reactor 108 control settings can be generated by sampling and/or decoding one or more latent variables from the latent space 304 comprised within the one or more VAE machine learning models (e.g., as described herein). Further, the generating at 1006 can be facilitated by one or more VAE machine learning models that have achieved a trained state through the training at 1004.

At 1008, the method 1000 can comprise operating (e.g., via reactor control component 502), by the system 100, one or more chemical reactors 108 in accordance with the one or more recommended chemical reactor 108 control settings. Example chemical reactors 108 that can be operated in accordance with the recommended chemical reactor 108 control settings can include, but are not limited to: tubular reactors, fixed bed reactors, fluid bed reactors, continuous stirred tank reactors, a combination thereof, and/or the like. In various embodiments, operating the one or more chemical reactors 108 at 1008 can be performed autonomously by the system 100.

At 1010, the method 1000 can comprise determining (e.g., via measurement component 602), by the system 100, one or more characteristics of the one or more polymers generated by the one or more chemical reactors 108. For example, the one or more chemical reactors 108 can comprise one or more sensors to measure and/or detect one or more physical and/or chemical properties of the one or more synthesized polymers. Example sensors can include, but are not limited to: timers, thermometers, calorimeters, spectroscopic equipment, equipment for mechanical testing, biochemical assays, a combination thereof, and/or the like.

At 1012, the method 1000 can comprise determining (e.g., via verification component 604), by the system 100, whether the one or more characteristics are within a permissible range defined by the one or more target polymer characteristics. For example, the determining at 1012 can comprise analyzing the one or more measurements and/or detections generated at 1010 to determine whether the one or more properties of the one or more synthesized polymers coincide with the one or more target polymer characteristics.

At 1014, the method 1000 can comprise updating (e.g., via update component 702), by the system 100, the training data based on the one or more recommended chemical reactor 108 control settings. Further, the updating at 1014 can comprise updating one or more training datasets 122 based on the one or more measurements and/or detections generated at 1010. In various embodiments, the updating at 1014 can facilitate one or more iterations of the training conducted at 1004.

Figure 11:
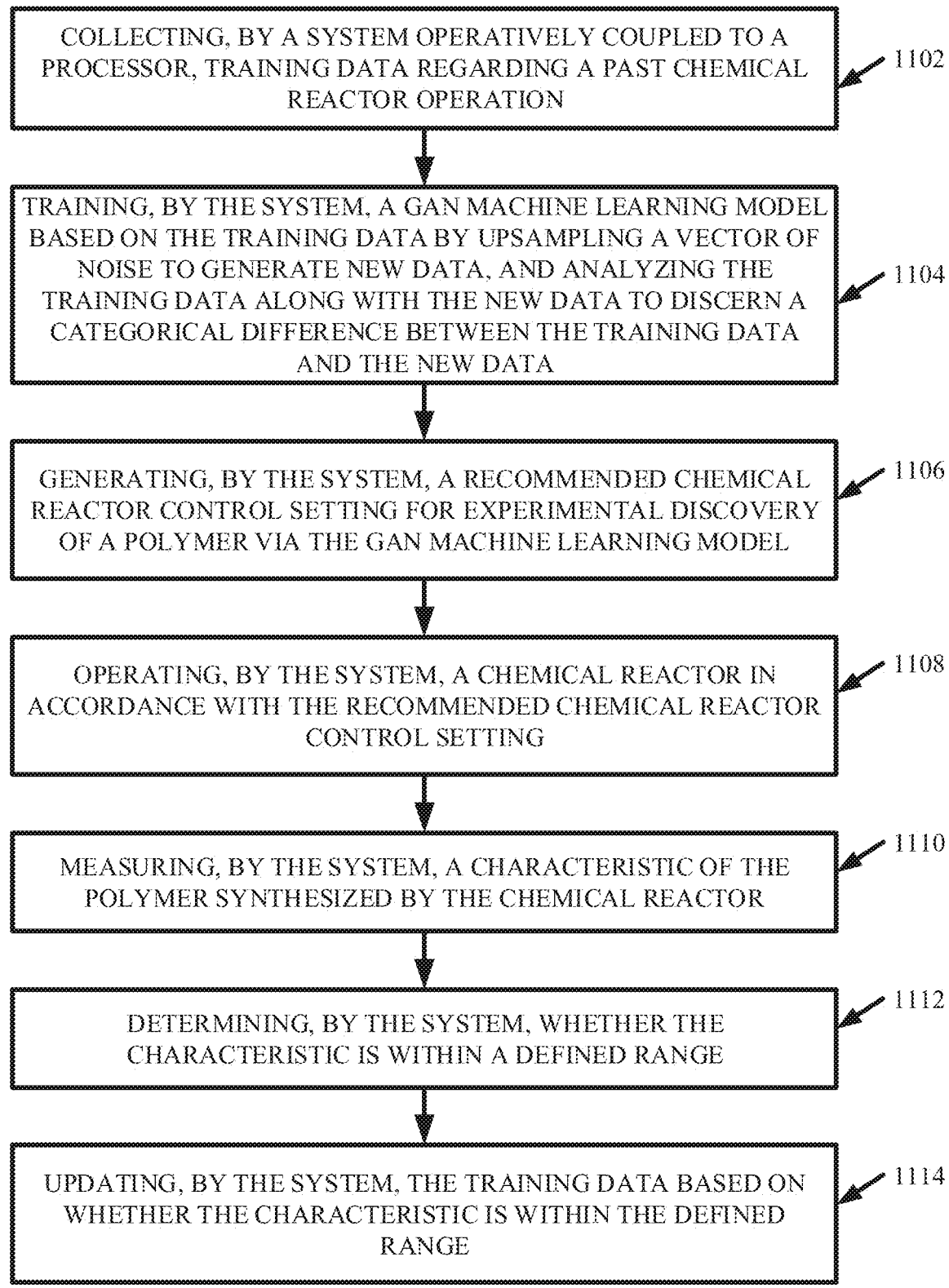
FIG. 11 illustrates a flow diagram of an example, non-limiting method that can facilitate operation of one or more chemical reactors for the experimental discovery of one or more polymers using one or more generative machine learning models in accordance with one or more embodiments described herein.

FIG. 11 illustrates a flow diagram of an example, non-limiting method 1100 that can facilitate controlling one or more chemical reactors 108 using one or more generative machine learning models in accordance with one or more embodiments described herein. Repetitive description of like elements employed in other embodiments described herein is omitted for sake of brevity.

At 1102, the method 1100 can comprise collecting (e.g., via data collection component 114), by a system 100 operatively coupled to a processor 120, training data regarding one or more past chemical reactor 108 operations. For example, the training data can include, but is not limited to the following control settings implemented during one or more chemical reactions previously performed by the one or more chemical reactors 108: chemical reactants, monomers, catalysts, co-catalysts, values of reactor parameters, initiators, retention time, temperature, flow rate, pressure, the order of component addition/mixing, exposure to ultraviolet light and/or other radiation, a combination thereof, and/or the like. In various embodiments, the collecting at 1002 can comprise generating and/or populating one or more training datasets 122 with the training data (e.g., as described herein).

At 1104, the method 1100 can comprise training (e.g., via model component 202), by the system 100, one or more GAN machine learning models based on the training data by upsampling a vector of noise to generate new data and/or analyzing the training data along with the new data to discern a categorical difference between the training data and the new data. For example, the training at 1104 can be performed in accordance with the various features described herein with regards to the one or more GAN training processes 400.

At 1106, the method 1000 can comprise generating (e.g., via model component 202), by the system 100, one or more recommended chemical reactor 108 control settings for experimental discovery of one or more polymers via the one or more GAN machine learning models. For example, the one or more recommended chemical reactor 108 control settings can be generated by one or more trained generator networks 402 comprised within the one or more GAN machine learning models. Further, the generating at 1106 can be facilitated by one or more GAN machine learning models that have achieved a trained state, wherein the one or more generator networks 402 can generate new data that cannot be readily discerned from training data by the one or more discriminator networks 404.

At 1108, the method 1100 can comprise operating (e.g., via reactor control component 502), by the system 100, one or more chemical reactors 108 in accordance with the one or more recommended chemical reactor 108 control settings. Example chemical reactors 108 that can be operated in accordance with the recommended chemical reactor 108 control settings can include, but are not limited to: tubular reactors, fixed bed reactors, fluid bed reactors, continuous stirred tank reactors, a combination thereof, and/or the like. In various embodiments, operating the one or more chemical reactors 108 at 1108 can be performed autonomously by the system 100.

At 1110, the method 1100 can comprise determining (e.g., via measurement component 602), by the system 100, one or more characteristics of the one or more polymers generated by the one or more chemical reactors 108. For example, the one or more chemical reactors 108 can comprise one or more sensors to measure and/or detect one or more physical and/or chemical properties of the one or more synthesized polymers. Example sensors can include, but are not limited to: timers, thermometers, calorimeters, spectroscopic equipment, equipment for mechanical testing, biochemical assays, a combination thereof, and/or the like.

At 1112, the method 1100 can comprise determining (e.g., via verification component 604), by the system 100, whether the one or more characteristics are within a permissible range defined by the one or more target polymer characteristics. For example, the determining at 1112 can comprise analyzing the one or more measurements and/or detections generated at 1110 to determine whether the one or more properties of the one or more synthesized polymers coincide with the one or more target polymer characteristics.

At 1114, the method 1100 can comprise updating (e.g., via update component 702), by the system 100, the training data based on the one or more recommended chemical reactor 108 control settings. Further, the updating at 1114 can comprise updating one or more training datasets 122 based on the one or more measurements and/or detections generated at 1110. In various embodiments, the updating at 1114 can facilitate one or more iterations of the training conducted at 1104.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 12:
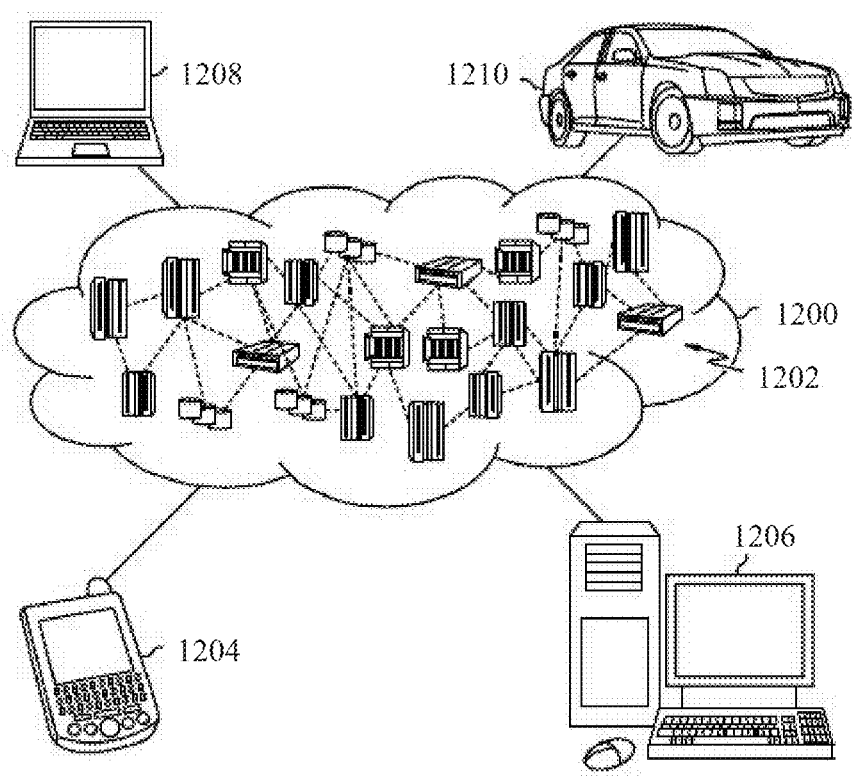
FIG. 12 depicts a cloud computing environment in accordance with one or more embodiments described herein.

Referring now to FIG. 12, illustrative cloud computing environment 1200 is depicted. As shown, cloud computing environment 1200 includes one or more cloud computing nodes 1202 with which local computing devices used by cloud consumers, such as, for example, personal digital assistant (PDA) or cellular telephone 1204, desktop computer 1206, laptop computer 1208, and/or automobile computer system 1210 may communicate. Nodes 1202 may communicate with one another. They may be grouped (not shown) physically or virtually, in one or more networks, such as Private, Community, Public, or Hybrid clouds as described hereinabove, or a combination thereof. This allows cloud computing environment 1200 to offer infrastructure, platforms and/or software as services for which a cloud consumer does not need to maintain resources on a local computing device. It is understood that the types of computing devices 1204-1210 shown in FIG. 12 are intended to be illustrative only and that computing nodes 1202 and cloud computing environment 1200 can communicate with any type of computerized device over any type of network and/or network addressable connection (e.g., using a web browser).

Figure 13:
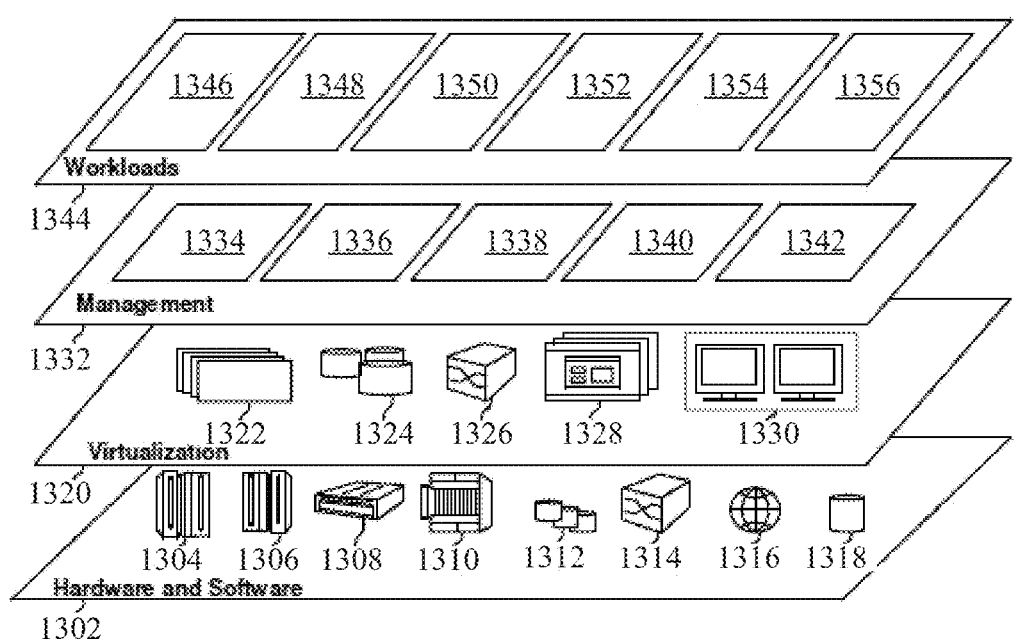
FIG. 13 depicts abstraction model layers in accordance with one or more embodiments described herein

Referring now to FIG. 13, a set of functional abstraction layers provided by cloud computing environment 1200 (FIG. 12) is shown. Repetitive description of like elements employed in other embodiments described herein is omitted for sake of brevity. It should be understood in advance that the components, layers, and functions shown in FIG. 13 are intended to be illustrative only and embodiments of the invention are not limited thereto. As depicted, the following layers and corresponding functions are provided.

Hardware and software layer 1302 includes hardware and software components. Examples of hardware components include: mainframes 1304; RISC (Reduced Instruction Set Computer) architecture based servers 1306; servers 1308; blade servers 1310; storage devices 1312; and networks and networking components 1314. In some embodiments, software components include network application server software 1316 and database software 1318.

Virtualization layer 1320 provides an abstraction layer from which the following examples of virtual entities may be provided: virtual servers 1322; virtual storage 1324; virtual networks 1326, including virtual private networks; virtual applications and operating systems 1328; and virtual clients 1330.

In one example, management layer 1332 may provide the functions described below. Resource provisioning 1334 provides dynamic procurement of computing resources and other resources that are utilized to perform tasks within the cloud computing environment. Metering and Pricing 1336 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1338 provides access to the cloud computing environment for consumers and system administrators. Service level management 1340 provides cloud computing resource allocation and management such that required service levels are met. Service Level Agreement (SLA) planning and fulfillment 1342 provide pre-arrangement for, and procurement of, cloud computing resources for which a future requirement is anticipated in accordance with an SLA.

Workloads layer 1344 provides examples of functionality for which the cloud computing environment may be utilized. Examples of workloads and functions which may be provided from this layer include: mapping and navigation 1346; software development and lifecycle management 1348; virtual classroom education delivery 1350; data analytics processing 1352; transaction processing 1354; and deep-learning discovery of chemical reactor 108 control settings 1356. Various embodiments of the present invention can utilize the cloud computing environment described with reference to FIGS. 12 and 13 to generate one or more recommended chemical reactor 108 control settings and/or autonomously operated one or more chemical reactors to facilitate the experimental discovery of polymers.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware based systems that perform the specified functions or acts or carry out combinations of special purpose hardware and computer instructions.

Figure 14:
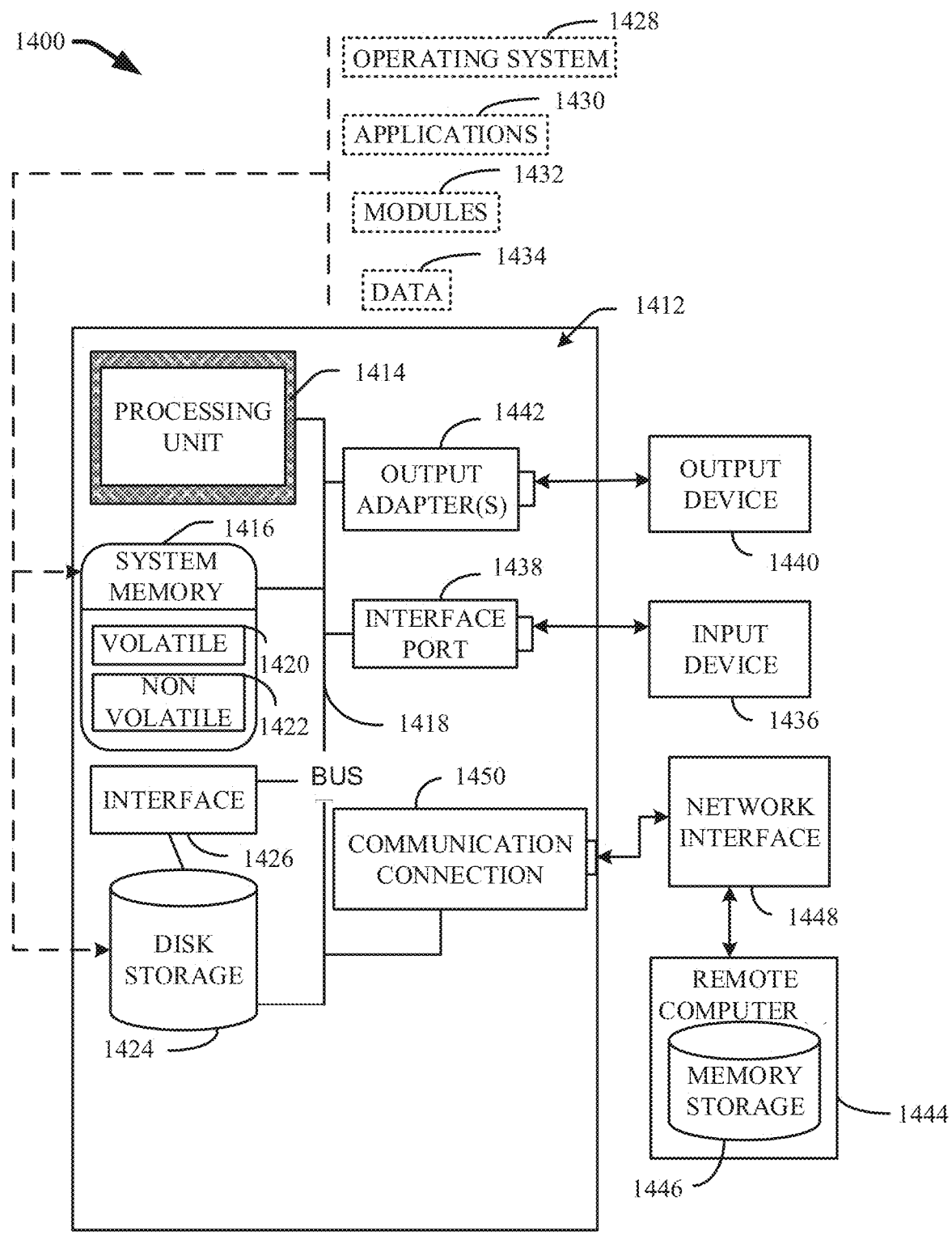
FIG. 14 illustrates a block diagram of an example, non-limiting operating environment in which one or more embodiments described herein can be facilitated.

In order to provide a context for the various aspects of the disclosed subject matter, FIG. 14 as well as the following discussion are intended to provide a general description of a suitable environment in which the various aspects of the disclosed subject matter can be implemented. FIG. 14 illustrates a block diagram of an example, non-limiting operating environment in which one or more embodiments described herein can be facilitated. Repetitive description of like elements employed in other embodiments described herein is omitted for sake of brevity. With reference to FIG. 14, a suitable operating environment 1400 for implementing various aspects of this disclosure can include a computer 1412. The computer 1412 can also include a processing unit 1414, a system memory 1416, and a system bus 1418. The system bus 1418 can operably couple system components including, but not limited to, the system memory 1416 to the processing unit 1414. The processing unit 1414 can be any of various available processors. Dual microprocessors and other multiprocessor architectures also can be employed as the processing unit 1414. The system bus 1418 can be any of several types of bus structures including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire, and Small Computer Systems Interface (SCSI). The system memory 1416 can also include volatile memory 1420 and nonvolatile memory 1422. The basic input/output system (BIOS), containing the basic routines to transfer information between elements within the computer 1412, such as during start-up, can be stored in nonvolatile memory 1422. By way of illustration, and not limitation, nonvolatile memory 1422 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1420 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1412 can also include removable/non-removable, volatile/non-volatile computer storage media. FIG. 14 illustrates, for example, a disk storage 1424. Disk storage 1424 can also include, but is not limited to, devices like a magnetic disk drive, floppy disk drive, tape drive, Jaz drive, Zip drive, LS-100 drive, flash memory card, or memory stick. The disk storage 1424 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1424 to the system bus 1418, a removable or non-removable interface can be used, such as interface 1426. FIG. 14 also depicts software that can act as an intermediary between users and the basic computer resources described in the suitable operating environment 1400. Such software can also include, for example, an operating system 1428. Operating system 1428, which can be stored on disk storage 1424, acts to control and allocate resources of the computer 1412. System applications 1430 can take advantage of the management of resources by operating system 1428 through program modules 1432 and program data 1434, e.g., stored either in system memory 1416 or on disk storage 1424. It is to be appreciated that this disclosure can be implemented with various operating systems or combinations of operating systems. A user enters commands or information into the computer 1412 through one or more input devices 1436. Input devices 1436 can include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices can connect to the processing unit 1414 through the system bus 1418 via one or more interface ports 1438. The one or more Interface ports 1438 can include, for example, a serial port, a parallel port, a game port, and a universal serial bus (USB). One or more output devices 1440 can use some of the same type of ports as input device 1436. Thus, for example, a USB port can be used to provide input to computer 1412, and to output information from computer 1412 to an output device 1440. Output adapter 1442 can be provided to illustrate that there are some output devices 1440 like monitors, speakers, and printers, among other output devices 1440, which require special adapters. The output adapters 1442 can include, by way of illustration and not limitation, video and sound cards that provide a means of connection between the output device 1440 and the system bus 1418. It should be noted that other devices and/or systems of devices provide both input and output capabilities such as one or more remote computers 1444.

Computer 1412 can operate in a networked environment using logical connections to one or more remote computers, such as remote computer 1444. The remote computer 1444 can be a computer, a server, a router, a network PC, a workstation, a microprocessor based appliance, a peer device or other common network node and the like, and typically can also include many or all of the elements described relative to computer 1412. For purposes of brevity, only a memory storage device 1446 is illustrated with remote computer 1444. Remote computer 1444 can be logically connected to computer 1412 through a network interface 1448 and then physically connected via communication connection 1450. Further, operation can be distributed across multiple (local and remote) systems. Network interface 1448 can encompass wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). One or more communication connections 1450 refers to the hardware/software employed to connect the network interface 1448 to the system bus 1418. While communication connection 1450 is shown for illustrative clarity inside computer 1412, it can also be external to computer 1412. The hardware/software for connection to the network interface 1448 can also include, for exemplary purposes only, internal and external technologies such as, modems including regular telephone grade modems, cable modems and DSL modems, ISDN adapters, and Ethernet cards.

Embodiments of the present invention can be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device including, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components including a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory. What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory;
a processor, operably coupled to the memory, wherein the processor:
builds a generative machine learning model based on training data regarding a past chemical reactor operation, wherein the generative machine learning model generates a recommended chemical reactor control setting for experimental discovery of a polymer with a target characteristic;
measures a characteristic of the polymer synthesized by the chemical reactor;
determines whether the characteristic is within a defined range of the target characteristic; and
updates the training data, with the recommended chemical reactor control setting, based on the determination that the characteristic is within the defined range.

2. The system of claim 1, wherein the generative machine learning model is a variational autoencoder model trained via a gradient decent algorithm that optimizes a loss function with respect to parameters of an encoder and a decoder.

3. The system of claim 2, wherein the generative machine learning model generates the recommended chemical reactor control setting by sampling a latent variable from a latent space and decoding the latent variable via the decoder.

4. The system of claim 1, wherein the generative machine learning model is via a generative adversarial network model comprising a generator network and a discriminator network.

5. The system of claim 4, wherein the generator network upsamples a vector of noise to generate new data, and wherein the discriminator network is a binomial classifier that analyzes the training data and the new data.

6. The system of claim 5, wherein the generator network achieves a trained state based on the discriminator network being unable to discern between the training data and the new data, and wherein the recommended chemical reactor control setting is comprised within the new data generated by the generator network while the generator network is in the trained state.

7. The system of claim 1, wherein the training data comprises a control setting implemented by a chemical reactor during the past chemical reactor operation.

8. The system of claim 1, wherein the processor:
operates a chemical reactor in accordance with the recommended chemical reactor control setting to synthesize the polymer.

9. The system of claim 1, wherein the target characteristic comprises molecular weight.

10. The system of claim 1, wherein the target characteristic comprises retention time.

11. A computer-implemented method, comprising:
generating, by a system operatively coupled to a processor, a generative machine learning model based on training data regarding a past chemical reactor operation, wherein the generative machine learning model generates a recommended chemical reactor control setting for experimental discovery of a polymer with a target characteristic;
measuring, by the system, a characteristic of the polymer synthesized by the chemical reactor;
determining, by the system, whether the characteristic is within a defined range of the target characteristic; and
updating, by the system, the training data, with the recommended chemical reactor control setting, based on the determination that the characteristic is within the defined range.

12. The computer-implemented method of claim 11, wherein the generative machine learning model is a variational autoencoder, and wherein the computer-implemented method further comprises:
training, by the system, the generative machine learning model using a gradient decent algorithm that optimizes a loss function with respect to parameters of an encoder and a decoder.

13. The computer-implemented method of claim 12, wherein the generative machine learning model generates the recommended chemical reactor control setting by sampling a latent variable from a latent space and decoding the latent variable via the decoder.

14. The computer-implemented method of claim 11, wherein the generative machine learning model is via a generative adversarial network comprising a generator network and a discriminator network.

15. The computer-implemented method of claim 14, further comprising:

training, by the system, the generative adversarial network by upsampling a vector of noise to generate new data and analyzing the training data along with the new data to discern a categorical difference between the training data and the new data.

16. A computer program product for controlling a chemical reactor, the computer program product comprising a computer readable storage medium having program instructions embodied therewith, the program instructions executable by a processor to cause the processor to:
generate, by a system operatively coupled to the processor, a generative machine learning model based on training data regarding a past chemical reactor operation, wherein the generative machine learning model generates a recommended chemical reactor control setting for experimental discovery of a polymer with a target characteristic, wherein the generative machine learning model is via a generative adversarial network model comprising a generator network and a discriminator network, and wherein the generator network upsamples a vector of noise to generate new data, and wherein the discriminator network is a binomial classifier that analyzes the training data and the new data;
measure, by the system, a characteristic of the polymer synthesized by the chemical reactor;
determine, by the system, whether the characteristic is within a defined range of the target characteristic; and
update, by the system, the training data with the recommended chemical reactor control setting, based on the determination that the characteristic is within the defined range.

17. The computer program product of claim 16, wherein the program instructions cause the processor to generate the generative machine learning model in a cloud computing environment.

18. The computer program product of claim 16, wherein the training data comprises a control setting implemented by the chemical reactor during the past chemical reactor operation.

19. The computer program product of claim 16, wherein the generative machine learning model is a variational autoencoder, and wherein the program instructions further cause the processor to train, by the system, the generative machine learning model using a gradient decent algorithm that optimizes a loss function with respect to parameters of an encoder and a decoder.

* * * * *